No. 756,497. PATENTED APR. 5, 1904.
W. P. HENRY.
PIVOTAL RUNNING GEAR.
APPLICATION FILED DEC. 4, 1902.
NO MODEL.
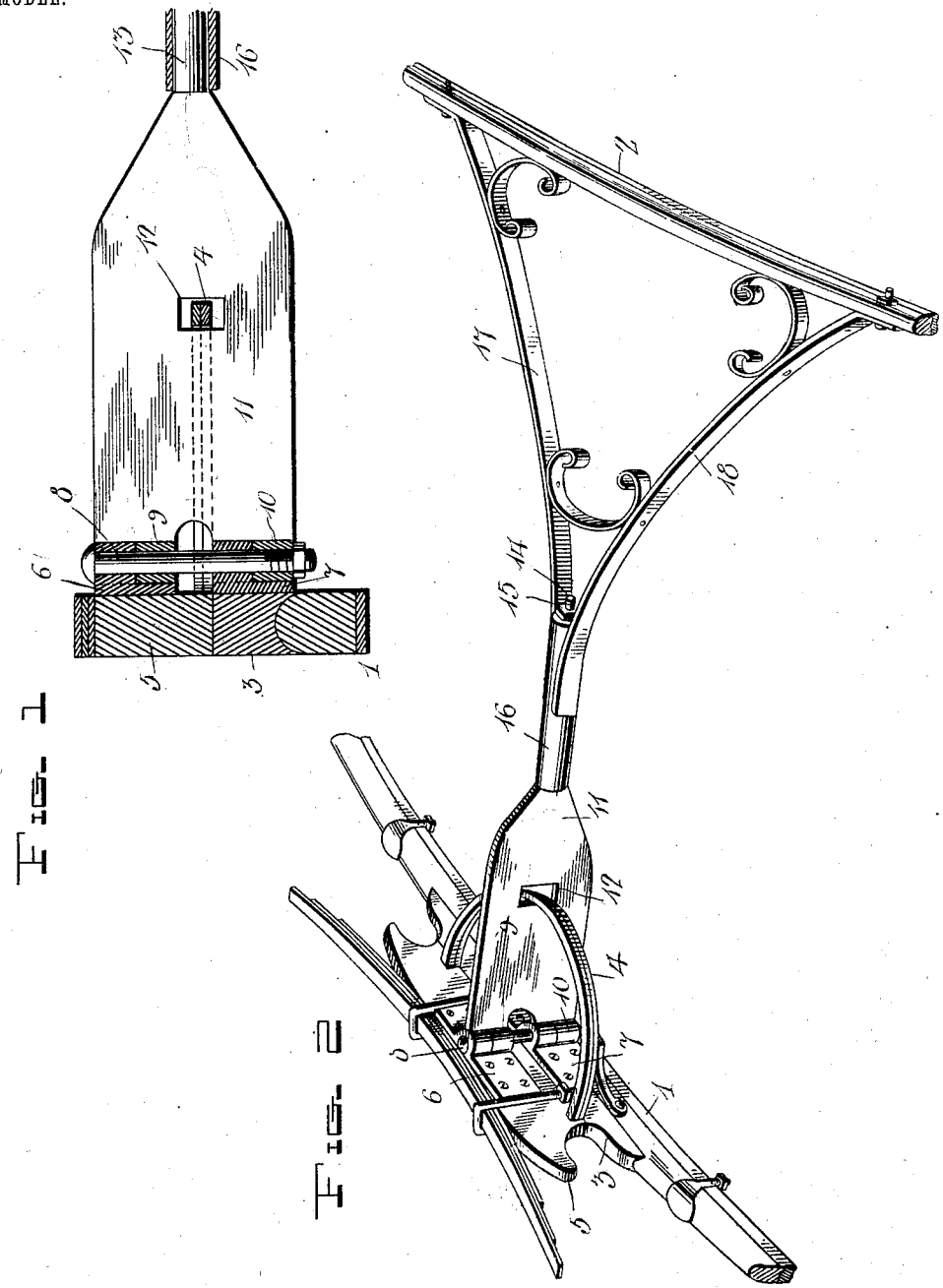
Witnesses
J. F. Adams
William B. Thomas
Inventor
William Pigman Henry.
By Charles D. Pennebaker,
Attorney.
THE NORRIS PETERS CO., PHOTO-LITHO., WASHINGTON, D. C.

No. 756,497. Patented April 5, 1904.

UNITED STATES PATENT OFFICE.

WILLIAM PIGMAN HENRY, OF CENTRAL CITY, KENTUCKY.

PIVOTAL RUNNING-GEAR.

SPECIFICATION forming part of Letters Patent No. 756,497, dated April 5, 1904.

Application filed December 4, 1902. Serial No. 133,890. (No model.)

*To all whom it may concern:*

Be it known that I, WILLIAM PIGMAN HENRY, a citizen of the United States, residing at Central City, in the county of Muhlenberg and State of Kentucky, have invented certain new and useful Improvements in Pivotal Running-Gear, of which the following is a specification.

My invention relates to pivotal running-gear couplings for vehicles generally, and belongs particularly to that class of devices introduced between the front and rear wheels which permit either axle to tilt independent of the other, according as a wheel on one side is raised higher by meeting and passing over an obstruction or drops lower than its companion by running into a depression. These devices are intended mainly to prevent straining and twisting of the connecting-frame.

My invention has the object in view just described in common with others in the class, and, additionally, it is designed to relieve the fifth-wheel of the twisting strain thrown upon it as the wheels take different levels.

I accomplish the object stated by employing the parts and associating them as illustrated in the accompanying drawings, wherein—

Figure 1 is an enlarged side view, partly in section, showing my invention connected with a front axle, and this view also shows the relative position of the fifth-wheel; and Fig. 2 is a perspective view showing both front and rear axles coupled by my invention.

Throughout the drawings like numerals refer to like parts.

Considering the drawings, numeral 1 marks the front axle, and numeral 2 the rear axle. Upon the front axle is the bolster 3, supporting the fifth-wheel 4, and above the fifth-wheel is a cap or cross-bar 5, on which the body-springs and body of the vehicle rest. To the cap 5 and bolster 3 are fastened suitable bearings or retaining apertured blocks 6 and 7 for a vertical pivot-bolt 8, and this bolt passes also through upper and lower eyes 9 and 10, formed at the end or edge of a slotted plate 11. The slot in the plate is marked 12. It will now be observed that the plate is attached pivotally both above and below the fifth-wheel, which passes through the slot 12. Plate 11 is approximately triangular in form and, regarding the end provided with the eyes 9 and 10 as the base of the triangle, its apex or the point of the plate is welded to the cylindrical rod 13, (see Fig. 1,) having a threaded end 14 and a nut 15. A sleeve or tube 16 movably incloses the rod 13 and is retained by the nut 15, as shown. Bars 17 and 18 are strongly secured to the sleeve, one on each side, and these bars lead divergently backward and are rigidly bolted to the hounds 19, attached to rear axle 2.

It is believed to be now made out that the rear axle may tilt without straining any of the coupling elements or disturbing the front axle. Similarly the front axle is independently movable; but my invention differs from all other devices for like purposes with which I am acquainted in the following particular: When the front axle of an ordinary vehicle tilts, the inclining motion is communicated to the body and load through the fifth-wheel, which is rarely constructed to withstand repeated wrenching of that sort, and damage results. By the use of my invention, however, the tilt of the axle is almost wholly transmitted to the body and load through plate 11, which it will be recalled is secured below and above the fifth-wheel. In this way the fifth-wheel is relieved of all strains other than those incidental to its normal office as a horizontal turn-table for the front wheels.

I am aware that numerous contrivances have been made to couple vehicles and allow the axles to tilt in vertical planes independently, and I do not claim that feature broadly.

What I claim as my invention, and seek to protect by Letters Patent, is—

In a pivotal running-gear coupling, the combination of a front axle, a bolster secured thereon, a fifth-wheel supported upon and attached to the said bolster, a cap fixed on top of the fifth-wheel, a rigid plate having a pivotal connection below the fifth-wheel with the said bolster and above the fifth-wheel with said cap whereby the vibration of the body of the vehicle with respect to the axle is taken up by the said plate, the said plate being provided with a slot 12 and said fifth-wheel passing through the said slot, a rod projecting from the free end of the said plate, a sleeve movably retained on the rod, bars having ends secured to the sleeve on opposite sides and diverging rearwardly, a rear axle, and attachments joining the said bars and the rear axle substantially as described.

In testimony whereof I affix my signature in presence of two witnesses.

WILLIAM PIGMAN HENRY.

Witnesses:
S. C. EAVES,
FRED HEAD.